United States Patent
Kalgaonkar et al.

(10) Patent No.: US 12,258,516 B2
(45) Date of Patent: Mar. 25, 2025

(54) METHODS TO USE WATER SHUTOFF MATERIAL COMPOSITION COMPRISING ALKALINE NANOSILICA DISPERSION AND SODIUM BICARBONATE IN DOWNHOLE CONDITIONS

(71) Applicant: Saudi Arabian Oil Company, Dhahran (SA)

(72) Inventors: Rajendra Arunkumar Kalgaonkar, Dhahran (SA); Vikrant Wagle, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 250 days.

(21) Appl. No.: 17/551,946

(22) Filed: Dec. 15, 2021

(65) Prior Publication Data
US 2023/0183545 A1   Jun. 15, 2023

(51) Int. Cl.
   *C09K 8/42*      (2006.01)
   *C09K 8/487*     (2006.01)

(52) U.S. Cl.
   CPC .............. *C09K 8/426* (2013.01); *C09K 8/487* (2013.01); *C09K 2208/10* (2013.01)

(58) Field of Classification Search
   None
   See application file for complete search history.

(56) References Cited

U.S. PATENT DOCUMENTS

| | | | |
|---|---|---|---|
| 4,732,213 A * | 3/1988 | Bennett | C09K 8/50 166/275 |
| 5,320,171 A | 6/1994 | Laramay | |
| 7,013,973 B2 | 3/2006 | Danican et al. | |
| 7,458,424 B2 | 12/2008 | Odeh et al. | |
| 7,934,557 B2 | 5/2011 | Nguyen | |
| 7,954,549 B2 | 6/2011 | Lende et al. | |
| 9,045,965 B2 | 6/2015 | Patil et al. | |
| 9,133,386 B2 | 9/2015 | Kumar et al. | |
| 10,053,613 B1 | 8/2018 | Kalgaonkar et al. | |
| 10,745,610 B2 | 8/2020 | Kalgaonkar et al. | |
| 10,954,427 B2 | 3/2021 | Kalgaonkar et al. | |
| 11,053,428 B2 | 7/2021 | Kalgaonkar et al. | |
| 2008/0035343 A1 * | 2/2008 | Odeh | C09K 8/516 166/293 |
| 2011/0094746 A1 | 4/2011 | Allison et al. | |
| 2013/0056215 A1 * | 3/2013 | Crews | B22F 1/102 166/310 |

(Continued)

FOREIGN PATENT DOCUMENTS

| WO | 2018204145 A1 | 11/2018 |
|---|---|---|
| WO | 2022006050 A1 | 1/2022 |
| WO | 2022010505 A1 | 1/2022 |

*Primary Examiner* — Anuradha Ahuja
(74) *Attorney, Agent, or Firm* — DINSMORE & SHOHL LLP

(57) ABSTRACT

A method of reducing water production in a wellbore may include introducing an alkaline nanosilica dispersion to the wellbore such that it contacts a water producing zone of the wellbore, introducing a sodium bicarbonate activator to the wellbore such that it contacts the alkaline nanosilica dispersion in the water producing zone, and forming a gelled solid from the water shutoff material in the water producing zone, thereby reducing water production in the wellbore.

18 Claims, 1 Drawing Sheet

(56) References Cited

U.S. PATENT DOCUMENTS

| | | | |
|---|---|---|---|
| 2013/0292120 A1* | 11/2013 | Patil | E21B 33/13 |
| | | | 166/293 |
| 2015/0322328 A1* | 11/2015 | Boul | C09K 8/426 |
| | | | 166/278 |
| 2018/0327648 A1 | 11/2018 | Bataweel et al. | |
| 2018/0346797 A1 | 12/2018 | Kalgaonkar et al. | |

* cited by examiner

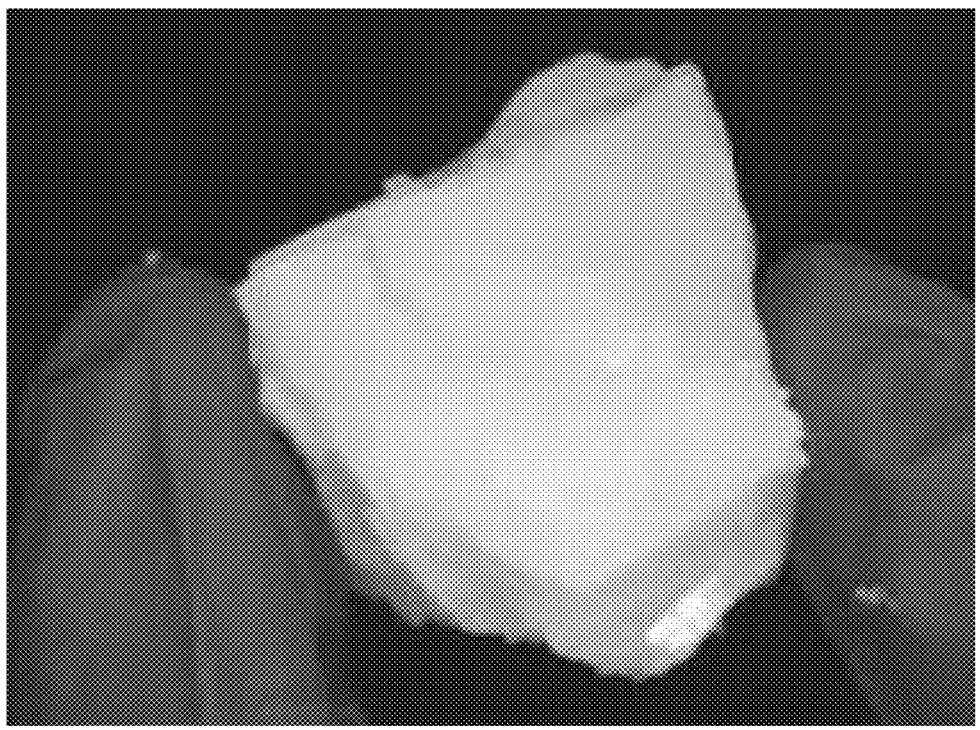

METHODS TO USE WATER SHUTOFF MATERIAL COMPOSITION COMPRISING ALKALINE NANOSILICA DISPERSION AND SODIUM BICARBONATE IN DOWNHOLE CONDITIONS

FIELD

Embodiments of the present disclosure generally relate to natural resource well drilling and, more specifically, to methods for treating water production zones of a wellbore.

TECHNICAL BACKGROUND

Extracting subterranean hydrocarbons sources may require drilling a hole from the surface to the subterranean geological formation housing the hydrocarbons. Specialized drilling techniques and materials are utilized to form the wellbore hole and extract the hydrocarbons. Specialized materials utilized in drilling operations include drilling fluids and materials for sealing the casing-casing annulus of the wellbore, which may be formulated for specific downhole conditions. A wellbore is a hole that extends from the surface to a location below the surface to permit access to hydrocarbon-bearing subterranean formations. The wellbore contains at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore. The fluid conduit may be defined by one or more tubular strings, such as casings, inserted into the wellbore and secured in the wellbore.

During drilling of a wellbore, cementing the wellbore, or both, water producing zones may be encountered which result in loss of drilling fluids, cementing compositions, or other fluids. In a water producing zone, unwanted water may flow into the wellbore from the surrounding formation, mixing with the drilling fluids, cement compositions, hydrocarbons, or other fluids. Water producing zones may increase the cost of the well through increased material costs to separate, treat, and dispose of produced water according to environmental regulations. Additionally, excessive water production may be responsible for many oilfield-related damage mechanisms including, but not limited to, scale depositions, fines migration, asphaltene precipitation, and corrosion.

SUMMARY

Water producing zones may be remediated by introducing a water shutoff material into the water producing zone to treat the water producing zone to either reduce or prevent further unwanted water production in the wellbore. An ongoing need exists for water shutoff materials for treating water producing zones encountered during resource well drilling with controlled formation time under a variety of downhole conditions to allow accurate placement without premature plugging inside the wellbore.

These needs are met by the embodiments of the water shutoff material compositions and methods for using the water shutoff material compositions of the present disclosure. One or more embodiments of the present disclosure provide a water shutoff material composition that may include an alkaline nanosilica dispersion and a sodium bicarbonate activator. The sodium bicarbonate activator may be present in an amount in a range of from 1 weight percent (wt. %) to 40 wt. % of the water shutoff material. The water shutoff material composition may have a controllable gelation time, and be stable under a variety of downhole conditions.

In one or more embodiments, a method of reducing water production in a wellbore includes introducing an alkaline nanosilica dispersion to the wellbore such that it contacts a water producing zone of the wellbore, introducing a sodium bicarbonate activator to the wellbore such that it contacts the alkaline nanosilica dispersion in the water producing zone, and forming a gelled solid from the water shutoff material in the water producing zone, thereby reducing water production in the wellbore. The alkaline nanosilica dispersion and sodium bicarbonate activator in the wellbore may form a water shutoff material. The sodium bicarbonate activator may be present in an amount in a range of from 1 weight percent (wt. %) to 40 wt. % of the water shutoff material. In one or more embodiments, the alkaline nanosilica dispersion and the sodium bicarbonate activator may not be premixed. In one or more embodiments, the alkaline nanosilica dispersion and the sodium bicarbonate activator may be premixed.

This summary is provided to introduce a selection of concepts that are further described in the detailed descriptions. This summary is not intended to identify key or essential features of the claimed subject matter, nor is it intended to be used as an aid in limiting the scope of the claimed subject matter.

Other aspects and advantages of this disclosure will be apparent from the following description of drawings and detailed description made with reference to the accompanying appended claims.

DESCRIPTION OF DRAWINGS

The FIGURE shows gelled nanosilica after static aging under pressure of 689.5 kPa (100 psi) at 121.1° C. (250° F.) for 16 hours.

DETAILED DESCRIPTION

Embodiments of the present disclosure provide water shutoff material compositions and methods to use such water shutoff material compositions in a subterranean natural resource well. More specifically, some embodiments herein are directed to convertible compositions and methods for producing a solid gel based water shutoff material from the convertible composition. In particular, embodiments herein are directed toward methods of reducing water production in a wellbore, which may include a convertible composition including an alkaline nanosilica and producing a solid gel based water shutoff material by contacting the alkaline nanosilica with a chemical activator.

Advantages of some embodiments of the present disclosure include, but are not limited to, network structures formed from alkaline nanosilica and sodium bicarbonate may be used in the gelled water shutoff material; nanosilica gelling can be controlled by varying the concentration of the sodium bicarbonate activator; the water shutoff material may use environmentally conscious components; the water shutoff material can be used at elevated temperatures; and optionally, the formation of the gelled water shutoff material may be delayed by adding the sodium bicarbonate activator separately, and at a later time, from the nanosilica dispersion.

In one or more embodiments, the water shutoff material compositions may include an alkaline nanosilica dispersion and a chemical activator. In one or more embodiments, the water shutoff material compositions include an alkaline nanosilica dispersion and sodium bicarbonate chemical activator, operable to form a gelled solid based water shutoff material. In one or more embodiments, the sodium bicarbonate acts as an activator that gels the nanosilica dispersion. In one or more embodiments, the water shutoff material compositions consist of an alkaline nanosilica dispersion and a chemical activator, wherein the chemical activator may be sodium bicarbonate.

The formation of gels using the combination of nanosilica dispersions and sodium bicarbonate according to embodiments herein may reduce water production in any suitable type of water producing zone. As used throughout this disclosure, the term "water producing zone" may refer to an area encountered during drilling operations in which the well produces undesired water.

As used throughout this disclosure, the term "subterranean natural resource well" may refer to a geologic region containing hydrocarbons, such as crude oil, hydrocarbon gases, or both, which may be extracted from the subterranean geologic region.

As used throughout this disclosure, the term "water shutoff material" may refer to any material that may be used to treat a water production zone.

As used throughout this disclosure, the term "conformance material" may refer to any material that may improve the efficiency of oil and gas productivity enhancement operations.

As used throughout this disclosure, the term "gel" may refer to the congealed silica nanoparticles after introducing an activator to the alkaline nanosilica dispersion and allowing sufficient time for a gel to form. A gel may be formed by a network of interconnected molecules, such as a cross-linked polymer or of micelles. The network gives a gel phase its structure and an apparent yield point. At the molecular level, a gel may be a dispersion in which both the network of molecules may be continuous and the liquid may be continuous. A gel may be sometimes considered as a single phase.

As used throughout this disclosure, the term "activator" may refer to a material or formulation used to induce gelling of the alkaline nanosilica dispersion.

As used throughout this disclosure, the terms "uphole" and "downhole" may refer to a position within a wellbore relative to the surface, with "uphole" indicating direction or position closer to the surface and "downhole" referring to direction or position farther away from the surface.

The wellbore forms a pathway capable of permitting both fluids and apparatus to traverse between the surface and the hydrocarbon-bearing formation. Besides defining the void volume of the wellbore, the wellbore wall also acts as the interface through which fluid can transition between the subterranean formation and the interior of the well bore. The wellbore wall can be unlined (that is, bare rock or formation) to permit such interaction with the formation or lined, such as by a tubular string, so as to prevent such interactions.

The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore. Example equipment connected at the surface to the fluid conduit includes pipelines, tanks, pumps, compressors, and flares. The fluid conduit may be large enough to permit introduction and removal of mechanical devices, including but not limited to tools, drill strings, sensors, and instruments, into and out of the interior of the well bore.

The wellbore may be drilled using a drill string in the presence of a drilling fluid. While drilling the wellbore, the drilling operation may encounter a lost circulation zone. When a lost circulation zone is encountered during drilling, fluids in the wellbore flow from the wellbore into the subterranean formation, resulting in loss of these fluids. These fluids can include but are not limited to drilling fluids, sealing compositions, spacer fluids, wash fluids, pre-flush fluids, or displacement fluids. In some instances, lost circulation may be caused by the natural state of the subterranean formation through which the drilling passes. For example, the subterranean formation may be naturally fractured or may be an unconsolidated formation, such as but not limited to gravel, sand, pea, or combinations of these. The subterranean formation may also include caves, caverns, tunnels, or other voids in the formation capable of receiving fluids from the wellbore. Alternatively, in other circumstances, the hydrostatic pressure of the fluids in the wellbore may be greater than the fracture gradient of the subterranean formation, which may cause at least some breakdown of the pores in the formation. If the pores in the formation break down, then the pores may become large enough to reduce the resistance to flow of fluids into and through the pores, which may result in the formation receiving fluids from the wellbore instead of resisting the flow of these fluids into the formation.

As previously discussed, some embodiments of the present disclosure are directed to water shutoff material compositions that form gels, and methods of treating water producing zones using the water shutoff material compositions. The water shutoff material compositions of the present disclosure for treating water producing zones in wellbores may include an alkaline nanosilica dispersion and sodium bicarbonate, wherein sodium bicarbonate may be a chemical activator used to induce gelling of the nanosilica dispersion.

In one or more embodiments, the alkaline nanosilica may be introduced into the wellbore such that the alkaline nanosilica contacts the water producing zone. Subsequently, the sodium bicarbonate activator may be introduced into the water producing zone in downhole conditions to contact the nanosilica dispersion. Contact of the sodium bicarbonate activator with the alkaline nanosilica results in the formation of a gelled solid formed from the reaction of the alkaline nanosilica and the sodium bicarbonate, thereby reducing water production in the wellbore.

In other embodiments, the alkaline nanosilica and the sodium bicarbonate activator may be mixed and then subsequently introduced into the lost circulation zone. The mixture thus introduced to the lost circulation zone may form a gelled solid, resulting in decreased water production.

In some embodiments, the gelling time (the time for which the nanosilica dispersion begins to form a gel) of the alkaline nanosilica dispersion may be controlled. For example, the gelling time may be affected by the concentration of sodium bicarbonate used. In embodiments, the gelling tendency of the system may be accelerated by changing the pH of the system from alkaline to acidic, where the more acidic the system, the faster the gel formation occurs. The amount of sodium bicarbonate used, for example, may thus depend upon the method used for introduction of the water shutoff material into the water producing zone; when premixed, a longer gel time may be desirable. In one or more embodiments, the time to form a gelled solid may be from 6-24 hours, from 12-24 hours, from 6-12 hours, from 1-24 hours, or from 1-12 hours.

In one or more embodiments, when a water producing zone is encountered, a convertible composition pill may be produced by mixing the alkaline nanosilica dispersion and the sodium bicarbonate activator. The convertible composition pill can be introduced into the wellbore. The convertible composition pill can be allowed to migrate to the water producing zone. The volume of the convertible composition pill can be based on the size of the water producing zone, as estimated based on the volume of water produced. The amount of chemical activator used can be adjusted based on the desired gel formation time. The solid gel water shutoff material then forms in the water producing zone and the solid gel water shutoff material fills the water producing zone, reducing or eliminating water production. Similar considerations and effects may be use in other embodiments where the alkaline nanosilica may be introduced to the wellbore in a first pill prior to contact of the nanosilica with the sodium bicarbonate activator, introduced in a second pill.

In one or more embodiments, it may be desirable to delay gelling of the alkaline nanosilica dispersion to avoid or minimize premature gelation during pumping of the alkaline nanosilica dispersion into the wellbore. In some embodiments, the alkaline nanosilica dispersion may be added to the wellbore to provide sufficient time for the alkaline nanosilica dispersion to reach the water producing zone. After waiting an appropriate amount of time based on the properties of both the wellbore and the water producing zone of the wellbore, the sodium bicarbonate activator may be added to the wellbore to induce gelling of the alkaline nanosilica dispersion.

Embodiments herein may be useful over a wide range of downhole conditions, including temperatures from 100° C. to 350° C. For example, the water shutoff material compositions may be used at temperatures from 100° C. to 150° C., from 100° C. to 200° C., from 100° C. to 250° C., from 100° C. to 300° C., from 100° C. to 350° C., from 150° C. to 200° C., from 150° C. to 250° C., from 150° C. to 300° C., from 150° C. to 350° C., from 200° C. to 250° C., from 200° C. to 300° C., from 200° C. to 350° C., from 250° C. to 300° C., from 250° C. to 350° C., or from 300° C. to 350° C.

As described above, water shutoff material compositions according to embodiments herein may be formed from an alkaline nanosilica dispersion and a sodium bicarbonate activator, wherein the alkaline nanosilica dispersion comprises silica nanoparticles in an alkaline dispersion.

In one or more embodiments, the alkaline silica nanoparticles may include nanoparticles formed from any type of alkaline silicate, including (but not limited to) sodium silicate and potassium silicate, among others. In some embodiments, the alkaline nanosilica dispersion does not include sodium silicate (i.e., is in the absence of sodium silicate).

In one or more embodiments, the alkaline nanosilica dispersion may include a silica nanoparticle composition having a pH from 9 to 11. In one or more embodiments, the alkaline nanosilica dispersion may have a pH from than 10 to 11.

In one or more embodiments, the average particle size of the alkaline silica nanoparticles of the alkaline nanosilica dispersion may be from 1 nm to 1000 nm, from 500 nm to 1000 nm, from 1 nm to 500 nm, from 1 nm to 250 nm, from 1 nm to 150 nm, from 1 nm to 100 nm, from 1 nm to 50 nm, from 1 nm to 25 nm, from 1 nm to 10 nm, from 1 nm to 5 nm, from 5 nm to 1000 nm, from 5 nm to 500 nm, from 5 nm to 250 nm, from 5 nm to 150 nm, from 5 nm to 100 nm, from 5 nm to 50 nm, from 5 nm to 25 nm, from 5 nm to 10 nm, from 10 nm to 1000 nm, from 10 nm to 500 nm, from 10 nm to 250 nm, from 10 nm to 150 nm, from 10 nm to 100 nm, from 10 nm to 70 nm, from 10 nm to 50 nm, from 10 nm to 25 nm, from 5 nm to 10 nm, from 20 nm to 1000 nm, from 20 nm to 500 nm, from 20 nm to 250 nm, from 20 nm to 150 nm, from 20 nm to 100 nm, from 20 nm to 70 nm, from 20 nm to 50 nm, from 20 nm to 25 nm, from 30 nm to 80 nm, from 40 nm to 50 nm, from 40 nm to 60 nm, from 40 nm to 70 nm, from 100 nm to 1000 nm, from 100 nm to 750 nm, from 100 nm to 500 nm, from 100 nm to 250 nm, from 200 nm to 1000 nm, from 200 nm to 750 nm, from 200 nm to 500 nm, from 200 nm to 250 nm, from 300 nm to 1000 nm, from 300 nm to 750 nm, from 300 nm to 500 nm, from 400 nm to 1000 nm, from 400 nm to 750 nm, from 400 nm to 500 nm, from 500 nm to 1000 nm, from 500 nm to 750 nm, or from 750 nm to 1000 nm. It should be understood that average silica nanoparticle size of the alkaline nanosilica dispersion may be in a range formed from any one of the lower bounds for such average particle size described herein to any one of the upper bounds for such average particle size described herein. The silica nanoparticle may have a particle size distribution, which may be monodisperse or polydisperse. Without intending to be bound by any particular theory, it is believed that an average particle size less than 1 nm may result in premature gelation. Further, it is believed that an average particle size greater than 1000 nm may not effectively induce gelling, or may require a time of greater than 24 hours to form a gel.

The alkaline silica nanoparticles may be distinguished from silica particles; silica particles have a much larger particle size in the range between 5 microns (5000 nm) and 100 microns (100,000 nm). The surface area of alkaline silica nanoparticles, which is greater than the surface area of silica particles, may be from 100 square meters per gram ($m^2/g$) to 500 $m^2/g$, from 100 $m^2/g$ to 400 $m^2/g$, from 100 $m^2/g$ to 300 $m^2/g$, from 100 $m^2/g$ to 200 $m^2/g$, from 200 $m^2/g$ to 500 $m^2/g$, from 200 $m^2/g$ to 400 $m^2/g$, from 200 $m^2/g$ to 300 $m^2/g$, from 300 $m^2/g$ to 500 $m^2/g$, from 300 $m^2/g$ to 400 $m^2/g$, or from 400 $m^2/g$ to 500 $m^2$. Without being bound to a particular theory, the greater surface area of the alkaline silica nanoparticles can affect the rate of gelation and the nature of the gels formed. More specifically, the smaller particle size of the alkaline silica nanoparticles in the alkaline nanosilica dispersion promotes faster gelling than silica particles. Additionally, selection of smaller alkaline silica nanoparticles may promote faster gelling than larger alkaline silica nanoparticles.

The concentration of the alkaline silica nanoparticles in the alkaline nanosilica dispersion may be from 5 percent by weight (wt. %) to 60 wt. % based on the total weight of the alkaline nanosilica dispersion. Without intending to be bound by any particular theory, the concentration of silica nanoparticles in the alkaline nanosilica dispersion may affect the rate of gel formation. For instance, it is believed that a greater concentration of silica nanoparticles in the alkaline nanosilica dispersion is associated with the faster rate of gel formation. The amount of the alkaline nanosilica dispersion added to the aqueous based drilling fluid may depend on the fluid weight of the aqueous based drilling fluid. The concentration of the alkaline silica nanoparticles in the nanosilica dispersion may be from 5 wt. % to 60 wt. %, from 5 wt. % to 55 wt. %, from 5 wt. % to 50 wt. %, from 5 wt. % to 45 wt. %, from 5 wt. % to 40 wt. %, from 5 wt. % to 35 wt. %, from 5 wt. % to 30 wt. %, from 5 wt. % to 25 wt. %, from 5 wt. % to 20 wt. %, from 5 wt. % to 15 wt. %, from 5 wt. % to 10 wt. %, from 10 wt. % to 60 wt. %, from 10 wt. % to 55 wt. %, from 10 wt. % to 50 wt. %, from 10 wt. % to 45 wt. %, from 10 wt. % to 40 wt. %, from 10 wt. % to 35 wt. %, from 10 wt. % to 30 wt. %, from 10 wt. % to 25 wt. %, from 10 wt. % to 20 wt. %, from 10 wt. % to 15 wt. %, 20 wt. % to 60 wt. %, from 20 wt. % to 55 wt. %, 20 wt. % to 50 wt. %, from 20 wt. % to 45 wt. %, from 20 wt. % to 40 wt. %, from 20 wt. % to 35 wt. %, from 20 wt. % to 30 wt. %, from 20 wt. % to 25 wt. %, from 25 wt. % to 60 wt. %, from 25 wt. % to 55 wt. %, from 25 wt. % to 50 wt. %, from 25 wt. % to 45 wt. %, from 25 wt. % to 40 wt. %, from 25 wt. % to 35 wt. %, from 25 wt. % to 30 wt. %, from 30 wt. % to 60 wt. %, from 30 wt. % to 55 wt. %, from 30 wt. % to 50 wt. %, from 30 wt. % to 45 wt. %, from 30 wt. % to 40 wt. %, from 30 wt. % to 35 wt. %, from 30 wt. % to 50 wt. %, from 30 wt. % to 45 wt. %, from 30 wt. % to 40 wt. %, from 30 wt. % to 35 wt. %, from 35 wt. % to 60 wt. %, from 35 wt. % to 55 wt. %, from 35 wt. % to 50 wt. %, from 35 wt. % to 45 wt. %, from 35 wt. % to 40 wt. %, from 40 wt. % to 60 wt. %, from 40 wt. % to 55 wt. %, from 40 wt. % to 50 wt. %, from 40 wt. % to 45 wt. %, from 45 wt. % to 60 wt. %, from 45 wt. % to 55 wt. %, from 45 wt. % to 50 wt. %, from 50 wt. % to 60 wt. %, from 50 wt. % to 55 wt. % or from 55 wt. % to 60 wt. %, based on the total weight of the alkaline nanosilica dispersion.

Formation of a gel according to embodiments herein may be initiated by contact of the above-described alkaline nanosilica dispersion with an activator. In embodiments, the activator may comprise sodium bicarbonate. In other embodiments, the activator may consist of or consist essentially of sodium bicarbonate.

The activator (sodium bicarbonate) may be used at a weight ratio to the alkaline nanosilica dispersion in a range from 1:1 to 1:100. As previously discussed, the ratio of the activator to the alkaline nanosilica dispersion may affect the rate of gel formation. Specifically, and without intending to be bound by any particular theory, the ratio of the activator to the alkaline nanosilica may be inversely related to the gelation time. For instance, increasing the ratio of activator to alkaline nanosilica dispersion may decrease the time needed for a gel to form from the alkaline nanosilica dispersion. In some embodiments, the ratio of sodium bicarbonate to the alkaline nanosilica dispersion may be in a range from 1:1 to 1:3. In other embodiments, the ratio of sodium bicarbonate to the alkaline nanosilica dispersion may be in a range from 1:1 to 1:10. In other embodiments, the ratio of sodium bicarbonate to the alkaline nanosilica dispersion may be in a range from 1:1 to 1:5. In other embodiments, the ratio of sodium bicarbonate to the alkaline nanosilica dispersion may be in a range from 1:3 to 1:5, such as 1:4. In other embodiments, the ratio of sodium bicarbonate to the alkaline nanosilica dispersion may be in a range from 1:3.5 to 1:4.5.

As previously discussed, in one or more embodiments, the alkaline nanosilica dispersion may have an initial pH between 9 and 11. Additionally. The alkaline nanosilica dispersion may have a pH from greater than 10 to less than or equal to 11. The sodium bicarbonate may decrease the pH of the dispersion, causing the alkaline nanosilica to aggregate, resulting in the formation of a solid gel. The amount of sodium bicarbonate in relation to the amount of alkaline nanosilica dispersion may impact the time or a solid gel to form at or within the water producing zone within a wellbore.

In one or more embodiments, the amount of sodium bicarbonate activator in the water shutoff material composition may be from 1 wt. % to 40 wt. %, based on the total weight of the water shutoff material composition. In some embodiments, the water shutoff material may include from 1 wt. % to 40 wt. %, from 1 wt. % to 35 wt. %, from 1 wt. % to 30 wt. %, from 1 wt. % to 25 wt. %, from 1 wt. % to 20 wt. %, from 1 wt. % to 15 wt. %, from 1 wt. % to 10 wt. %, from 1 wt. % to 5 wt. %, from 5 wt. % to 40 wt. %, from 5 wt. % to 35 wt %, from 5 wt. % to 30 wt. %, from 5 wt. % to 25 wt. %, from 5 wt. % to 20 wt. %, from 5 wt. % to 15 wt. %, from 5 wt. % to 10 wt. %, from 10 wt. % to 40 wt. %, from 10 wt. % to 35 wt. %, from 10 wt. % to 30 wt. %, from 10 wt. % to 25 wt. %, from 10 wt. % to 20 wt. %, from 10 wt. % to 15 wt. %, from 15 wt. % to 40 wt. %, from 15 wt. % to 35 wt. %, from 15 wt. % to 30 wt. %, from 15 wt. % to 25 wt. %, from 15 wt. % to 20 wt. %, from 20 wt. % to 40 wt. %, from 20 wt. % to 35 wt. %, from 20 wt. % to 30 wt. %, from 20 wt. % to 25 wt. %, from 25 wt. % to 40 wt. %, from 25 wt. % to 35 wt. %, from 25 wt. % to 30 wt. %, from 30 wt. % to 40 wt. %, from 30 wt. % to 35 wt. %, or from 35 wt. % to 40 wt. % sodium bicarbonate, based on the total weight of the water shutoff material. It should be understood that amount of sodium bicarbonate activator in the water shutoff material composition may be in a range formed from any one of the lower bounds for such amount described herein to any one of the upper bounds for such amount described herein. Without intending to be bound by any particular theory, it is believed that an amount of sodium bicarbonate activator in the water shutoff material composition less than 1 wt. % may not effectively induce gelling, or may require a time of greater than 24 hours to form a gel. Further, it is believed that an amount of sodium bicarbonate activator in the water shutoff material composition greater than 40 wt. % may result in premature gelation before the water shutoff material composition may reach the water producing zone.

In some embodiments, the silica nanoparticles of the alkaline nanosilica dispersion are not modified with organosilane moieties, such as but not limited to, siloxanes, silazanes, disilazanes, ethoxy silanes, methoxy silanes, silanes containing an epoxy group, or mixtures thereof. In some embodiments, the silica nanoparticles of the alkaline nanosilica dispersion are not modified with organosilane moieties, such as but not limited to, octyl triethoxysilane, methyl triethoxysilane, methyl trimethoxysilane, tris[3-(trimethoxysilyepropyl]isocyanurate, 3-mercaptopropyl trimethoxysilane, beta-(3,4-epoxycyclohexyl)-ethyl trimethoxysilane, silanes containing an epoxy group (epoxy silane), glycidoxy and/or a glycidoxypropyl group, such as 3-(glycidoxypropyl)trimethoxy silane (which can also be known as trimethoxy[3-(oxiranylmethoxy)propyl]silane), 3-glycidoxypropyl methyldiethoxysilane, (3-glycidoxypropyl)triethoxy silane, (3-glycidoxypropyl)hexyltrimethoxy silane, beta-(3,4-epoxycyclohexyl)-ethyltriethoxysilane; 3-methacryloxypropyl trimethoxysilane, 3-methacryloxypropyl triisopropoxysilane, 3-methacryloxypropyl triethoxysilane, octyltrimethoxy silane, ethyltrimethoxy silane, propyltriethoxy silane, phenyltrimethoxy silane, 3-mercaptopropyltriethoxy silane, cyclohexyltrimethoxy silane, cyclohexyltriethoxy silane, dimethyldimethoxy silane, 3-chloropropyltriethoxy silane, 3-methacryloxypropyltrimethoxy silane, i-butyltriethoxy silane, trimethylethoxy silane, phenyldimethylethoxy silane, hexamethyldisiloxane, trimethylsilyl chloride, ureidomethyltriethoxy silane, ureidoethyltriethoxy silane, ureidopropyltriethoxy silane, hexamethyldisilizane, or mixtures thereof.

In one or more embodiments of the method of treating a water producing zone in a wellbore, wherein the activator may be added a period of time after the introduction of the alkaline nanosilica dispersion to the water producing zone, a shorter gelation time may be desired. As discussed previously, in some embodiments, it may be desirable to delay gelling of the water shutoff material composition. In one or more embodiments, a method of treating a water producing zone in a wellbore may include introducing an unmodified alkaline nanosilica dispersion to a wellbore, waiting a sufficient amount of time for the alkaline nanosilica dispersion to reach the water producing zone of the wellbore, introducing sodium bicarbonate to the wellbore such that it makes contact with the water producing zone and/or the alkaline nanosilica dispersion and forms a gel. In some embodiments, the time between introducing the alkaline nanosilica dispersion to the wellbore and introducing the sodium bicarbonate to the wellbore may be referred to as a "delay time." In some embodiments, the delay time may be from 1 hour to 24 hours. For instance, in some embodiments, the delay time may be from 1 hour to 4 hours, from 1 hour to 8 hours, from 1 hour to 12 hours, from 1 hour to 16 hours, from 1 hour to 20 hours, from 1 hour to 24 hours, from 4 hours to 8 hours, from 4 hours to 12 hours, from 4 hours to 16 hours, from 4 hours to 20 hours, from 4 hours to 24 hours, from 8 hours to 12 hours, from 8 hours to 16 hours, from 8 hours to 20 hours, from 8 hours to 24 hours, from 12 hours to 16 hours, from 12 hours to 20 hours, from 12 hours to 24 hours, from 16 hours to 20 hours, from 16 hours to 24 hours, or from 20 hours to 24 hours.

One or more embodiments of the water shutoff material composition also includes additives. Suitable additives include, but not limited to, one or more fluid loss additives. Without being bound by any particular theory, the addition of fluid loss additives to the water shutoff material composition may prevent or reduce initial fluid leak off before gelation may occur.

In other embodiments, however, it has been found that a water shutoff material composition consisting essentially of an alkaline nanosilica dispersion and a sodium bicarbonate activator may effectively and efficiently form a gel sufficient for reducing water production in a water producing zone of a wellbore. In one or more embodiments, it has been found that a water shutoff material consisting essentially of an alkaline nanosilica dispersion, a sodium bicarbonate activator, and a viscosifier may be used for reducing water production in a water producing zone of a wellbore.

According to one or more embodiments herein, the water shutoff material composition may contain less than 5% by weight salts, which may include, but are not limited to NaCl, $CaCl_2$, NaBr, or a combination of two or more thereof. In other embodiments, the water shutoff material composition may contain less than 4% by weight salts, less than 3% by weight salts, less than 2% by weight salts, less than 1% by weight salts, or less than 0.1% by weight salts. Without being bound by any particular theory, it is believed that the salts may be added to the water shutoff material composition without negative effects on the water shutoff material composition at room temperature. However, the addition of salts at higher concentrations may affect the stability of the water shutoff material composition. Additionally, salts in the water shutoff material composition may result in premature conversion of the convertible composition into the solid gel lost circulation material at elevated temperatures. Additionally, it is believed that the water shutoff material composition may be stable under alkaline conditions. The addition of one or more acidic salts may result in instability of the water shutoff material composition, which may result in a faster gelation time. Further, it is believed that the addition of one or more basic salts may not destabilize the water shutoff material composition, or may destabilize the water shutoff material composition to a lesser amount, relative to an equal concentration of one or more acidic salts.

According to an aspect, either alone or in combination with any other aspect, a method of reducing water production in a wellbore includes introducing an alkaline nanosilica dispersion to the wellbore such that it contacts a water producing zone of the wellbore, introducing a sodium bicarbonate activator to the wellbore such that it contacts the alkaline nanosilica dispersion in the water producing zone, and forming a gelled solid from the water shutoff material in the water producing zone, thereby reducing water production in the wellbore. The alkaline nanosilica dispersion and sodium bicarbonate activator in the wellbore may form a water shutoff material. The sodium bicarbonate activator may be present in an amount in a range of from 1 weight percent (wt. %) to 40 wt. % of the water shutoff material. The alkaline nanosilica dispersion and the sodium bicarbonate activator may not be premixed.

According to a second aspect, either alone or in combination with any other aspect, the alkaline nanosilica dispersion comprises alkaline silica nanoparticles having an average particle size from 5 nm to 70 nm.

According to a third aspect, either alone or in combination with any other aspect, the alkaline nanosilica dispersion comprises from 30 weight percent to 50 weight percent of alkaline silica nanoparticles based on the total weight of the alkaline nanosilica dispersion.

According to a fourth aspect, either alone or in combination with any other aspect, the alkaline nanosilica dispersion has a pH from 9 to 11.

According to a fifth aspect, either alone or in combination with any other aspect, the alkaline nanosilica dispersion has a pH of greater than 10 to less than or equal to 11.

According to a sixth aspect, either alone or in combination with any other aspect, a weight ratio of the sodium bicarbonate activator to the alkaline nanosilica dispersion is from 1:1 to 1:10.

According to a seventh aspect, either alone or in combination with any other aspect, formation of the gelled solid occurs within from 2 hours to 24 hours.

According to an eighth aspect, either alone or in combination with any other aspect, the alkaline silica nanoparticles are not modified with organosilane moieties.

According to a ninth aspect, either alone or in combination with any other aspect, a method of reducing water production in a wellbore includes introducing an alkaline nanosilica dispersion to the wellbore such that it contacts a water producing zone of the wellbore, introducing a sodium bicarbonate activator to the wellbore such that it contacts the alkaline nanosilica dispersion in the water producing zone, and forming a gelled solid from the water shutoff material in the water producing zone, thereby reducing water production in the wellbore. The alkaline nanosilica dispersion and sodium bicarbonate activator in the wellbore may form a water shutoff material. The sodium bicarbonate activator may be present in an amount in a range of from 1 weight percent (wt. %) to 40 wt. % of the water shutoff material. The alkaline nanosilica dispersion and the sodium bicarbonate activator may be premixed.

According to a tenth aspect, either alone or in combination with any other aspect, wherein the alkaline nanosilica dispersion comprises alkaline silica nanoparticles having an average particle size from 5 nm to 70 nm.

According to an eleventh aspect, either alone or in combination with any other aspect, the alkaline nanosilica dispersion comprises from 30 weight percent to 50 weight percent of alkaline silica nanoparticles based on the total weight of the alkaline nanosilica dispersion.

According to a twelfth aspect, either alone or in combination with any other aspect, the alkaline nanosilica dispersion has a pH from 9 to 11.

According to a thirteenth aspect, either alone or in combination with any other aspect, the alkaline nanosilica dispersion has a pH of greater than 10 to less than or equal to 11.

According to a fourteenth aspect, either alone or in combination with any other aspect, a weight ratio of the sodium bicarbonate activator to the alkaline nanosilica dispersion is from 1:1 to 1:10.

According to a fifteenth aspect, either alone or in combination with any other aspect, formation of the gelled solid occurs within from 2 hours to 24 hours.

According to a sixteenth aspect, either alone or in combination with any other aspect, the alkaline silica nanoparticles are not modified with organosilane moieties.

EXAMPLE

The various embodiments of the present disclosure will be further clarified by the following example. The example is illustrative in nature, and should not be understood to limit the embodiments of the present disclosure. In the example, an alkaline nanosilica dispersion in combination with a sodium bicarbonate activator was evaluated for use in the water shutoff method described in the present disclosure Example 1

80 grams of an alkaline nanosilica dispersion was added to a beaker. The nanosilica dispersion (IDISIL SI 4545) used in one or more embodiments was obtained from Evonik Industries (Essen, Germany). Typical properties of the alkaline nanosilica dispersion used in one or more embodiments include an average particle size of 45 nm, 45 wt. % $SiO_2$, a pH from 9 to 11 at 25° C., a specific gravity of 1.32 g/mL, a viscosity of less than 5 millipascal seconds (mPa·s) (<5 centipoise), and a white or off-white visual appearance. 20 grams of sodium bicarbonate was added to the beaker containing 80 grams of alkaline nanosilica dispersion in the beaker. The dispersion was mixed well using a stirrer. The nanosilica dispersion along with sodium bicarbonate was subjected to static aging under pressure of 689.5 kilopascals (kPa) (100 psi) at 121.1° C. (250° F.) for 16 hours. After 16 hours of static aging, the nanosilica dispersion was converted into a solid as shown in FIGURE.

It will be apparent to persons of ordinary skill in the art that various modifications and variations can be made without departing from the scope of the present disclosure. Since modifications, combinations, sub-combinations, and variations of the disclosed embodiments, which incorporate the spirit and substance of the present disclosure, may occur to persons of ordinary skill in the art, the scope of the present disclosure should be construed to include everything within the scope of the appended claims and their equivalents.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A method of reducing water production in a wellbore, the method comprising:
   introducing an alkaline nanosilica dispersion with a first pH to the wellbore such that it contacts a water producing zone of the wellbore;
   introducing a sodium bicarbonate activator to the wellbore such that it contacts the alkaline nanosilica dispersion in the water producing zone and decreases the first pH of the alkaline nanosilica dispersion, thereby forming a water shutoff material; and
   forming a gelled solid from the water shutoff material in the water producing zone, thereby reducing water production in the wellbore;
   wherein:

the sodium bicarbonate activator is present in an amount in a range of from 25 weight percent to 40 weight percent of the water shutoff material, and the water shutoff material is formed within the wellbore.

2. The method of claim 1, wherein the alkaline nanosilica dispersion comprises alkaline silica nanoparticles having an average particle size from 5 nm to 70 nm.

3. The method of claim 1, wherein the alkaline nanosilica dispersion comprises from 30 weight percent to 50 weight percent of alkaline silica nanoparticles based on the total weight of the alkaline nanosilica dispersion.

4. The method of claim 1, wherein the first pH of the alkaline nanosilica dispersion is in a range from 9 to 11.

5. The method of claim 1, wherein the first pH of the alkaline nanosilica dispersion is in a range of greater than 10 to less than or equal to 11.

6. The method of claim 1, wherein a weight ratio of the sodium bicarbonate activator to the alkaline nanosilica dispersion in the water shutoff material is from 1:1 to 1:10.

7. The method of claim 1, wherein the alkaline silica nanoparticles are not modified with organosilane moieties.

8. The method of claim 1, wherein the water shutoff material consists essentially of the alkaline nanosilica dispersion and the sodium bicarbonate activator.

9. The method of claim 1, wherein the sodium bicarbonate activator is present in an amount in a range of from 25 weight percent to 30 weight percent of the water shutoff material.

10. A method of reducing water production in a wellbore, the method comprising:

introducing a water shutoff material comprising an alkaline nanosilica dispersion with a first pH and a sodium bicarbonate activator to the wellbore such that the sodium bicarbonate activator reduces the first pH of the alkaline nanosilica dispersion and the water shutoff material contacts a water producing zone of the wellbore; and forming a gelled solid from the water shutoff material in the water producing zone, thereby reducing water production in the wellbore;

wherein the sodium bicarbonate activator is present in an amount in a range of from 25 weight percent to 40 weight percent of the water shutoff material.

11. The method of claim 10, wherein the alkaline nanosilica dispersion comprises alkaline silica nanoparticles having an average particle size from 5 nm to 70 nm.

12. The method of claim 10, wherein the alkaline nanosilica dispersion comprises from 30 weight percent to 50 weight percent of alkaline silica nanoparticles based on the total weight of the alkaline nanosilica dispersion.

13. The method of claim 10, wherein the first pH of the alkaline nanosilica dispersion is in a range from 9 to 11.

14. The method of claim 10, wherein the first pH of the alkaline nanosilica dispersion is in a range of greater than 10 to less than or equal to 11.

15. The method of claim 10, wherein a weight ratio of the sodium bicarbonate activator to the alkaline nanosilica dispersion in the water shutoff material is from 1:1 to 1:10.

16. The method of claim 10, wherein the alkaline silica nanoparticles are not modified with organosilane moieties.

17. The method of claim 10, wherein the water shutoff material consists essentially of the alkaline nanosilica dispersion and the sodium bicarbonate activator.

18. The method of claim 10, wherein the sodium bicarbonate activator is present in an amount in a range of from 25 weight percent to 30 weight percent of the water shutoff material.

\* \* \* \* \*